(12) United States Patent
Abiassi

(10) Patent No.: US 9,476,409 B2
(45) Date of Patent: Oct. 25, 2016

(54) OFFSHORE WIND TURBINE

(71) Applicant: ZACHRY CONSTRUCTION CORPORATION, San Antonio, TX (US)

(72) Inventor: Jean J. Abiassi, San Antonio, TX (US)

(73) Assignee: Zachry Construction Corporation, San Antonio, TX (US)

( * ) Notice: Subject to any disclaimer, the term of this patent is extended or adjusted under 35 U.S.C. 154(b) by 746 days.

(21) Appl. No.: 13/834,698

(22) Filed: Mar. 15, 2013

(65) Prior Publication Data

US 2014/0103664 A1    Apr. 17, 2014

Related U.S. Application Data

(60) Provisional application No. 61/646,166, filed on May 11, 2012.

(51) Int. Cl.
| | |
|---|---|
| *F03B 7/00* | (2006.01) |
| *F03D 11/04* | (2006.01) |
| *F03D 1/00* | (2006.01) |

(52) U.S. Cl.
CPC ............ *F03D 11/045* (2013.01); *F03D 1/001* (2013.01); *F03D 1/005* (2013.01); *F03D 13/22* (2016.05); *F05B 2240/95* (2013.01); *Y02E 10/727* (2013.01)

(58) Field of Classification Search
CPC ...... F03D 1/001; F03D 1/005; F03D 11/045; F03D 11/04; F05B 2240/93; F05B 2240/931; F05B 2240/95; F05B 2240/97; F05B 2240/98; F05B 2230/6102; Y02E 10/727
USPC ............... 416/85, 86, 244 R, 244 A, DIG. 6; 415/3.1, 7, 906
See application file for complete search history.

(56) References Cited

U.S. PATENT DOCUMENTS

| | | | |
|---|---|---|---|
| 6,955,025 | B2 | 10/2005 | Dehlsen et al. |
| 7,112,010 | B1 | 9/2006 | Geiger |
| 7,234,409 | B2 | 6/2007 | Hansen |

(Continued)

FOREIGN PATENT DOCUMENTS

| | | | | |
|---|---|---|---|---|
| DE | 10056857 A1 | * | 7/2001 | ............ F03D 11/045 |
| DE | 10101405 A1 | * | 7/2002 | ............ F03D 11/045 |

(Continued)

OTHER PUBLICATIONS

Machine generated translation of DE 101 01 405 A1 obtained on Nov. 11, 2015.*

(Continued)

*Primary Examiner* — Nicholas J Weiss
*Assistant Examiner* — Ngoc T Nguyen
(74) *Attorney, Agent, or Firm* — Dykema Gossett P.L.L.C.

(57) ABSTRACT

An offshore wind turbine apparatus may include a platform and an equalizer with sealed internal volumes, a turbine mast connected to the platform, a turbine which is connected to the turbine mast, and turbine blades connected to the turbine. The apparatus may be rotatably mounted on a barge via a trunnion. The apparatus may rotate from a substantially horizontal position to a substantially upright position when sufficient ballast material is inserted into the equalizer. The equalizer may rest on a sea floor. The platform may provide a restorative buoyant force that tends to cause the apparatus to return to the upright position when perturbed from the upright position.

20 Claims, 14 Drawing Sheets

(56) References Cited

U.S. PATENT DOCUMENTS

| | | | |
|---|---|---|---|
| 7,612,462 B2 | 11/2009 | Viterna | |
| 7,877,933 B2 | 2/2011 | Watchorn | |
| 8,016,519 B2 | 9/2011 | Bingham et al. | |
| 2004/0169376 A1* | 9/2004 | Ruer | F03D 11/045 290/55 |
| 2006/0082160 A1* | 4/2006 | Lee | F03D 11/04 290/55 |
| 2010/0219645 A1* | 9/2010 | Yamamoto | F03D 11/045 416/85 |
| 2010/0281820 A1 | 11/2010 | Soe-Jensen | |
| 2011/0058925 A1 | 3/2011 | Springett et al. | |
| 2011/0123274 A1 | 5/2011 | Soe-Jensen | |
| 2011/0139056 A1 | 6/2011 | Cholley et al. | |
| 2011/0200425 A1 | 8/2011 | Weaver | |
| 2011/0214596 A1 | 9/2011 | Wang | |
| 2011/0305523 A1 | 12/2011 | Karal et al. | |
| 2012/0045345 A1 | 2/2012 | Horton, III et al. | |
| 2014/0234105 A1* | 8/2014 | Tolo | F03D 1/001 416/85 |

FOREIGN PATENT DOCUMENTS

| | | | | |
|---|---|---|---|---|
| DE | WO 03004869 A1 * | 1/2003 | | F03D 11/045 |
| DE | 10332382 | 2/2005 | | |
| DE | 102010040887 A1 * | 3/2012 | | F03D 11/045 |
| DE | 102012222610 A1 * | 6/2014 | | F03D 9/023 |
| FI | WO 2013076351 A1 * | 5/2013 | | F03D 11/045 |
| FR | 2990476 A1 * | 11/2013 | | F03D 11/04 |
| GB | 2407114 | 4/2005 | | |
| WO | WO 2009064737 A1 * | 5/2009 | | F03D 11/045 |
| WO | WO2010138622 | 12/2010 | | |
| WO | WO2011051804 | 5/2011 | | |
| WO | WO2011083021 | 7/2011 | | |

OTHER PUBLICATIONS

Certified Human Translation of DE 101 01 405 A1.*
"Platform." Merriam-Webster.com. Merriam-Webster, n.d. Web. Jun. 6, 2016.*
Certified English translation of German Patent Application No. DE 101 01 405 A1 prepared by Eurasia Translations, Inc. on Feb. 2, 2016.

* cited by examiner

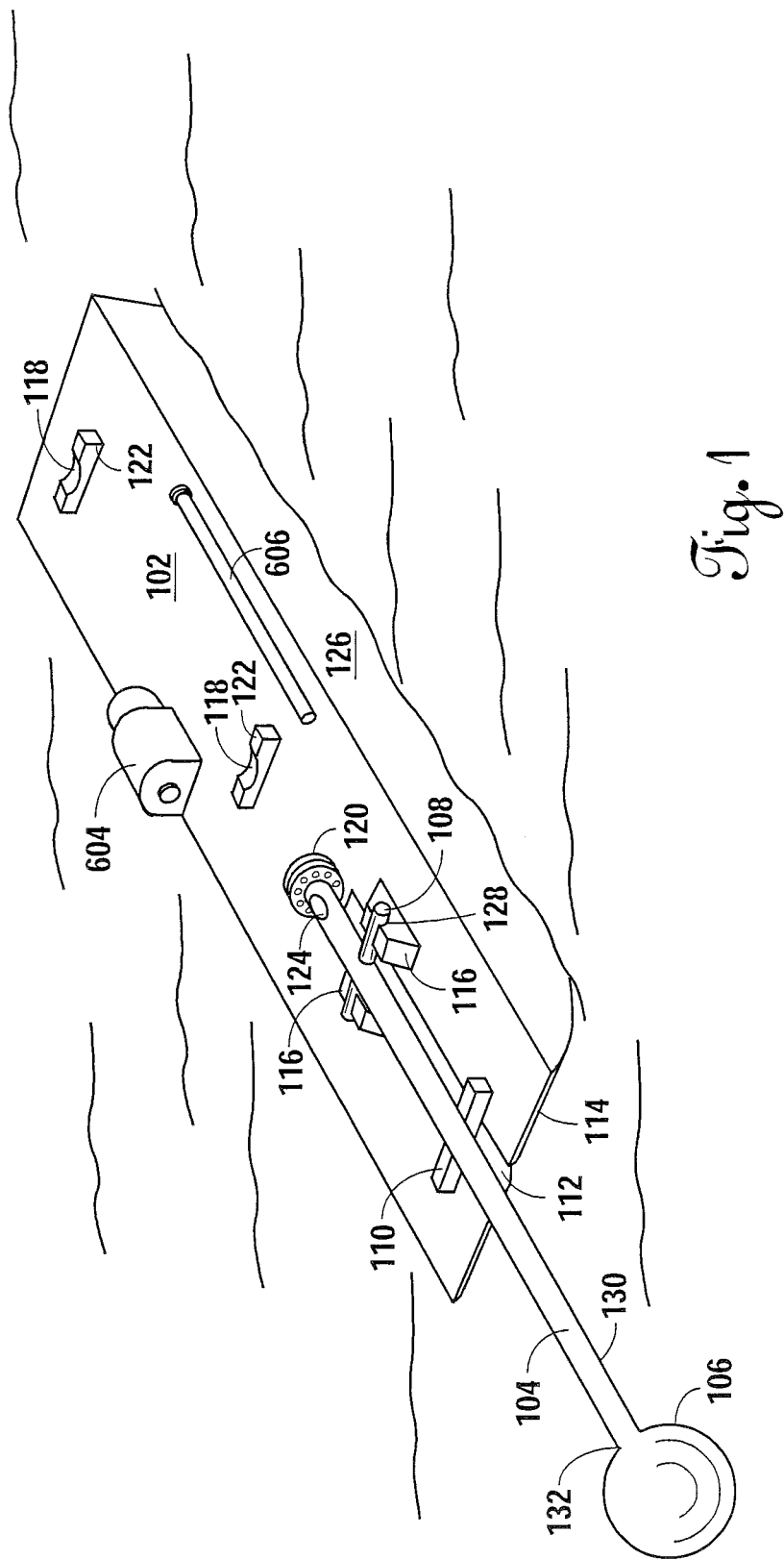

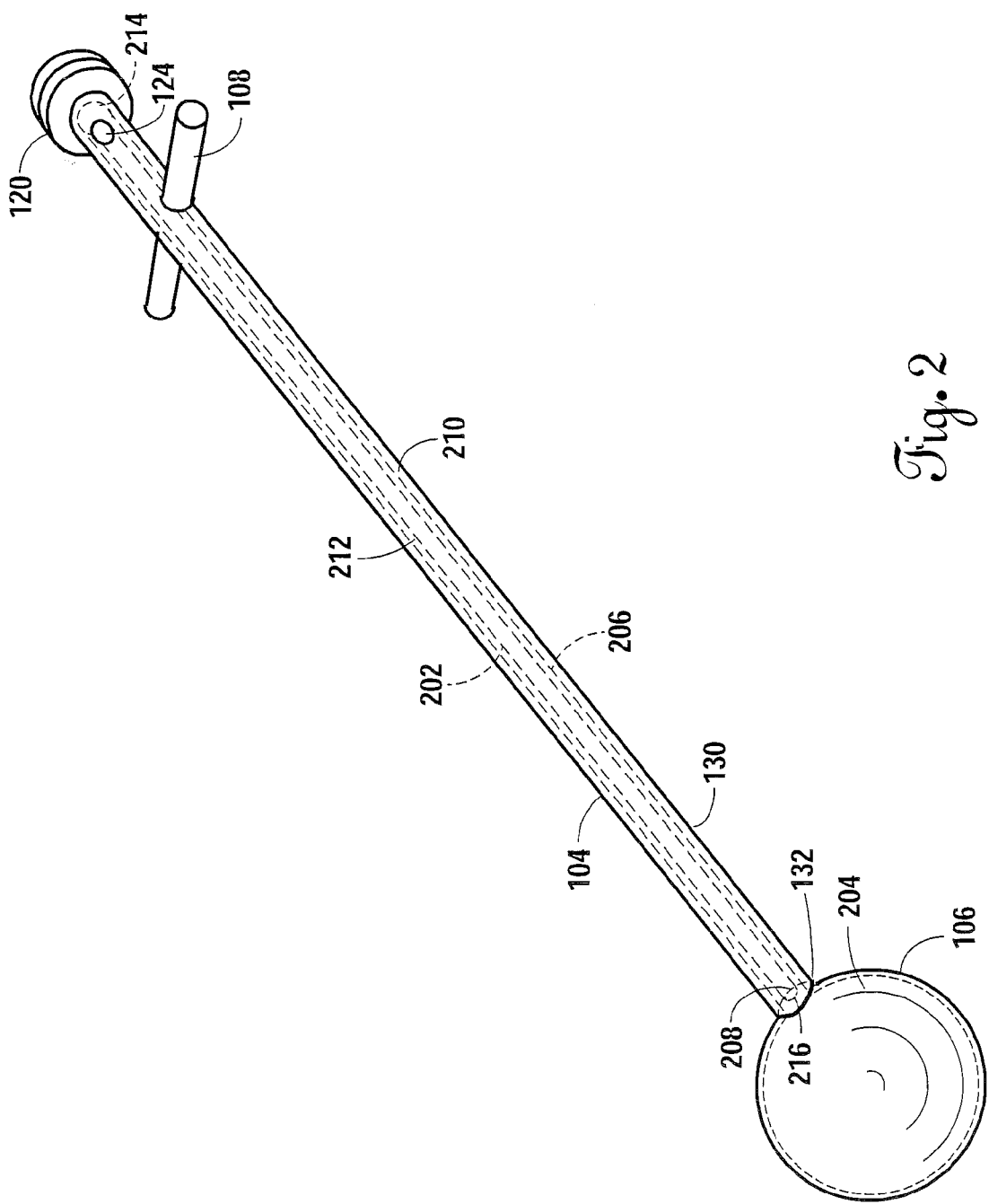

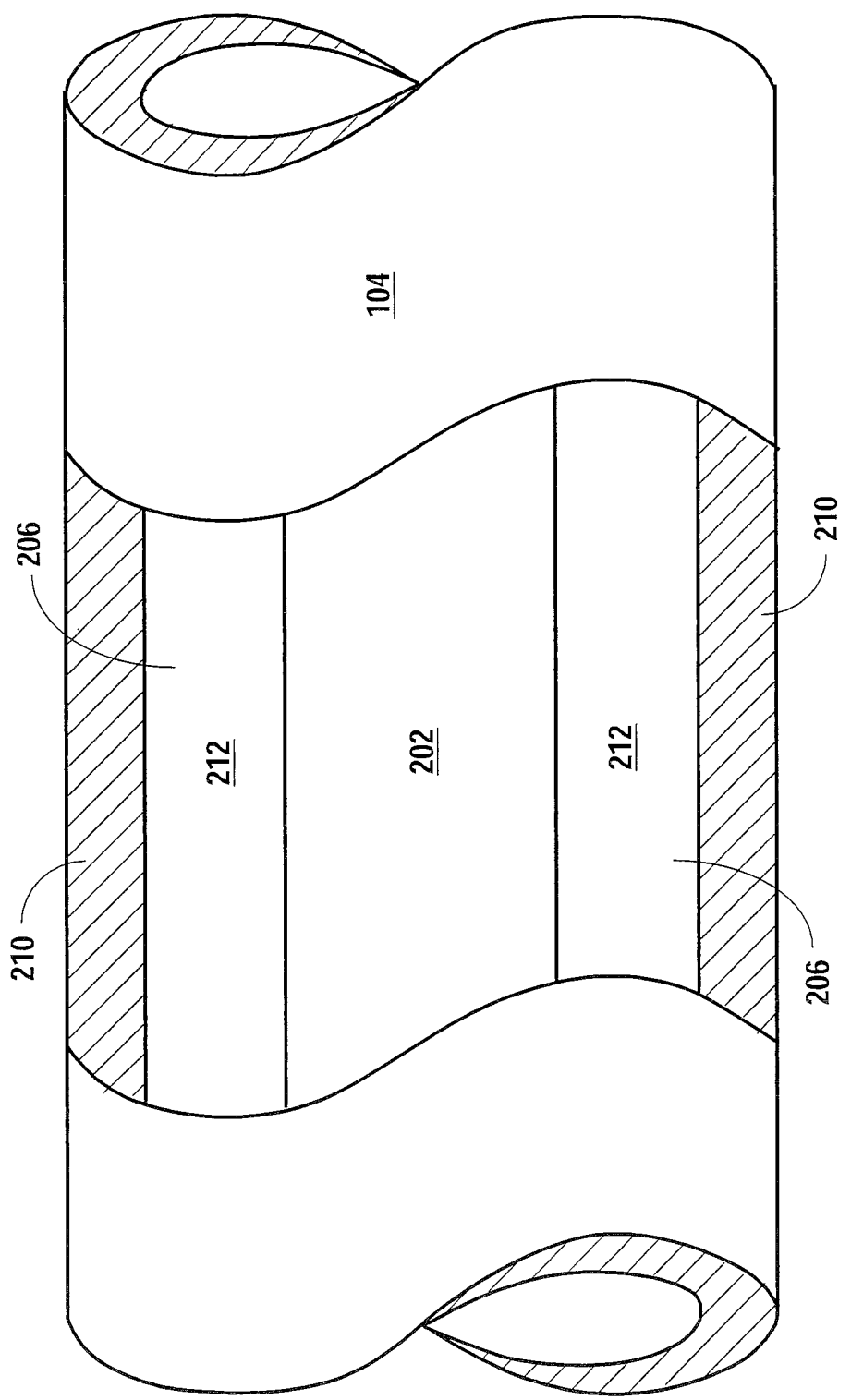

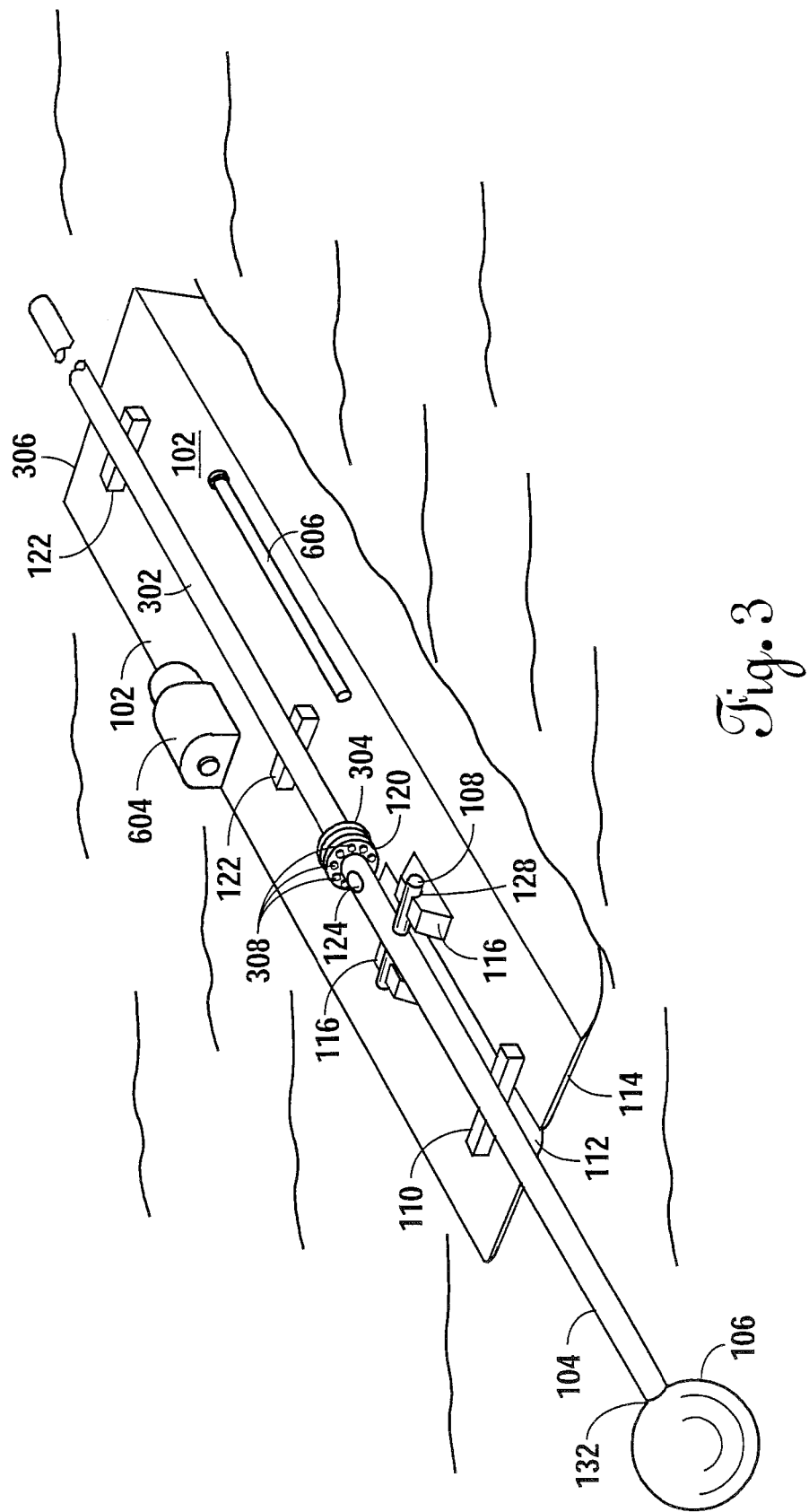

OFFSHORE WIND TURBINE

CROSS REFERENCE TO RELATED APPLICATIONS

This application claims priority to U.S. Provisional Patent Application No. 61/646,166 filed May 11, 2012, the disclosure of which is incorporated herein by reference.

FIELD

This application relates generally to the field of offshore wind turbines, and more specifically to an offshore wind turbine which includes an equalizer, a platform, a turbine mast, a turbine, and turbine blades, and a method for installing the offshore wind turbine at an offshore location.

BACKGROUND

In the field of offshore wind turbines, there is often a high cost and significant investment of time involved in the construction and installation of an offshore wind turbine. The construction of an offshore wind turbine typically takes place at an offshore installation site, requiring the use of large offshore marine cranes, large barges, jackup rigs, and other specialized, offshore equipment. In some cases, such equipment must be rated for high-impact loads experienced due to weather conditions at sea, such as waves and wind. In addition, offshore turbine installation typically involves two general steps: first, a platform is secured to the sea floor and second, a turbine mast and other equipment are installed on the platform. Offshore turbine assemblies typically involve large platforms which are secured to the sea floor using drive piles, suction piles, or some other anchoring device, prior to installation of the remainder of the wind turbine apparatus. Both the steps of securing the platform to the sea floor and installing additional structure on the platform require large investments of time, specialized equipment and money. Thus, there is a need for an improved apparatus, system and method for an offshore wind turbine which may be assembled at a dock or wharf before transportation to the installation site, which is easy to transport to the installation site, which is easily installed at the installation site, and which does not require a platform to be secured to the sea floor before installation of the remainder of the offshore wind turbine.

SUMMARY

An offshore wind turbine assembly may include an elongated platform including a first internal volume, an opening, and a cover configured for closing said opening. The offshore wind turbine assembly may also include a trunnion engaged with the platform and about which the platform is rotatable. The offshore wind turbine assembly may also include an equalizer depending from a first portion of the platform, the equalizer including a second internal volume. The offshore wind turbine assembly may include a conduit in fluid communication with the opening and the second internal volume. The offshore wind turbine assembly may also include an elongated turbine mast depending from a second portion of the platform. In addition, the offshore wind turbine assembly may include a turbine mounted to the turbine mast, the turbine including at least one turbine blade. The opening may be configured to receive a ballast material and the conduit may be configured to channel at least some of the ballast material from the opening to the second internal volume. Also, the first internal volume may be configured to provide buoyancy.

An offshore wind turbine construction and installation apparatus may include a barge including an end, a rotational support, and an open passage extending from the end to a location proximate the rotational support. The apparatus may also include an elongated platform including a first internal volume, an opening, and a cover configured for closing the opening. The apparatus may include a trunnion engaged with the platform and about which the platform is rotatable, the trunnion being rotatably engaged with the rotational support. The apparatus may include an equalizer depending from a first portion of the platform, the equalizer including a second internal volume. The apparatus may also include a temporary support on which the platform is configured to rest in a first position, the temporary support being removable to allow the platform to rotate through the open passage to an upright position.

The apparatus may also include a conduit in fluid communication with the opening and the second internal volume. In addition, the apparatus may include an elongated turbine mast depending from a second portion of the platform and a turbine mounted to the turbine mast, the turbine including at least one turbine blade. The opening may be configured to receive a ballast material, and the conduit may be configured to channel at least some of the ballast material from the opening to the second internal volume. In addition, one or both of the second internal volume and the conduit may be configured to receive a sufficient amount of the ballast material to cause the platform to rotate from the first position to the upright position when the temporary support is removed. Also, the first internal volume may be configured to provide a buoyant force that tends to restore the platform to the upright position if the platform is perturbed from the upright position.

A method of installing an offshore wind turbine assembly may include placing an elongated platform on a barge, the platform including a trunnion, a first internal volume, an opening, an equalizer having a second internal volume, and a conduit in fluid communication with the opening and the second internal volume. The barge may include an end, a rotational support for receiving said trunnion, a temporary support between the end and the rotational support, and an open passage extending from the end to a location proximate the rotational support. The platform may rest on the temporary support in a first position.

The method may also include attaching an elongated turbine mast to the platform and attaching a turbine to the turbine mast, the turbine including at least one turbine blade. The method may include moving the barge to an offshore installation site and removing the temporary support. The method may also include inserting a ballast material into the conduit and the second internal volume through the opening, thereby causing the platform to rotate about the trunnion through the open passage into an upright position. The method may include closing the opening with a cover and disengaging the trunnion from the rotational support.

BRIEF DESCRIPTION OF THE DRAWINGS

FIG. 1 is a perspective view of a barge having a platform with an equalizer disposed thereon.

FIG. 2 is a perspective view of one embodiment of a platform including an internal tube.

FIG. 2A is a close-up, partially cut-away view of a portion of a platform and an internal tube.

FIG. 3 is a perspective view of the barge of FIG. 1 having a platform and a turbine mast disposed thereon.

DETAILED DESCRIPTION

As used herein, the following terms should be understood to have the indicated meanings:

When an item is introduced by "a" or "an," it should be understood to mean one or more of that item.

"Attached" means, with respect to two or more objects, fastened together by any suitable fastener, including but not limited to one or more stitches, staples, brads, bolts, rivets, nails, screws, tacks, glue, adhesive, epoxy, welds, ties, or a combination thereof.

"Comprises" means includes but is not limited to.

"Comprising" means including but not limited to.

"Having" means including but not limited to.

"Water line" means a location at which the surface of a body of water normally contacts an offshore wind turbine assembly.

Figure 8:
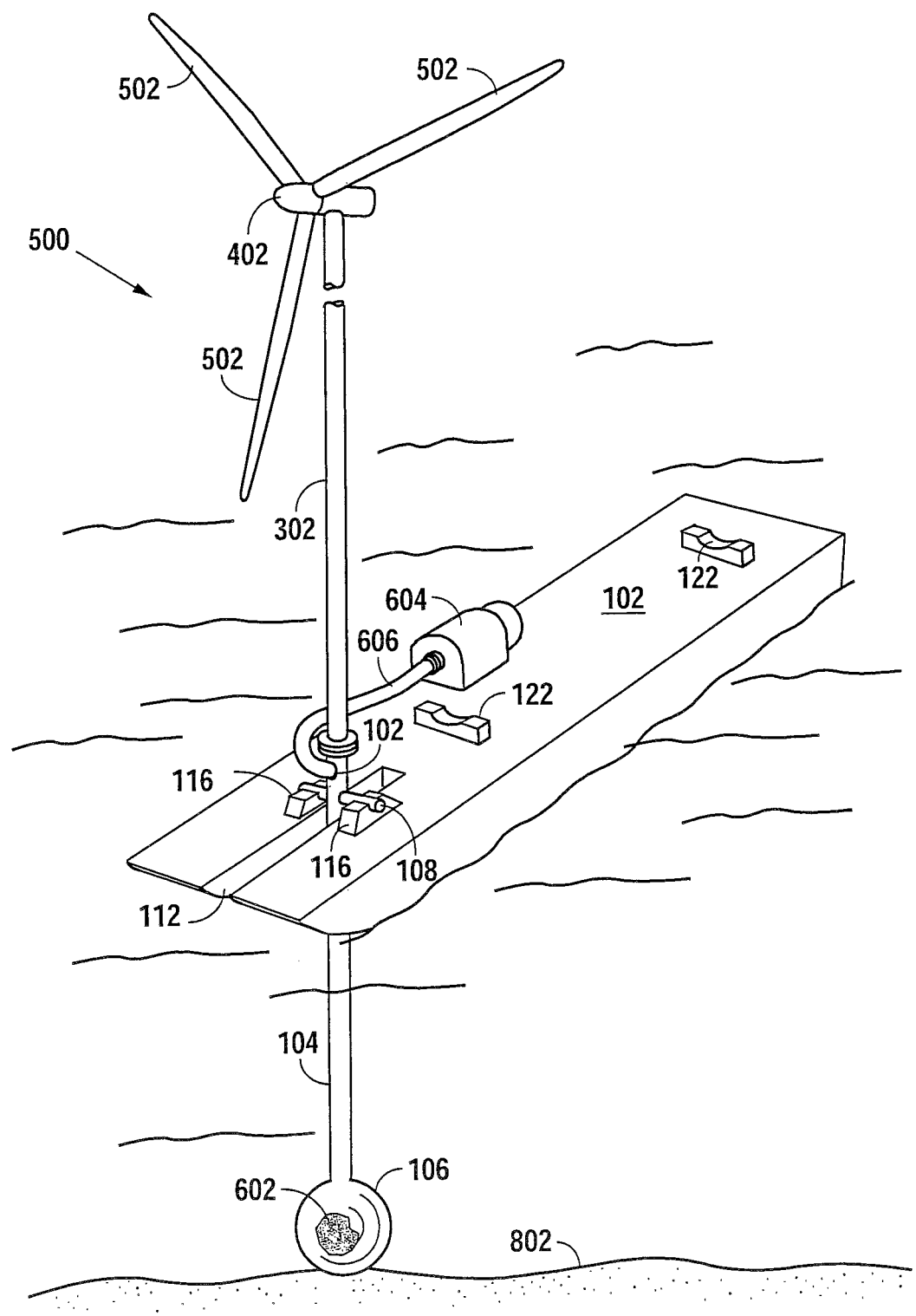
FIG. 8 is a perspective view of the barge of FIG. 1 and an offshore wind turbine assembly in an upright position.

FIG. 1 shows a barge 102 including a trunnion support 116, a temporary support 110, and two (2) mast supports 122. Barge 102 is shown supporting a platform 104 which includes an equalizer 106 and a trunnion 108. Barge 102 may include an opening 112 disposed at a lateral end 114 of barge 102 which is configured to allow platform 104 to move from a horizontal position, as shown in FIG. 1, to an upright position, as shown in FIG. 8. Opening 112 may extend from lateral end 114 to a location past trunnion support 116, thus allowing platform 104 to rotate to the upright position while attached to barge 102, as discussed in more detail below. Opening 112 may be sufficiently wide to allow passage of platform 104.

Figure 6:
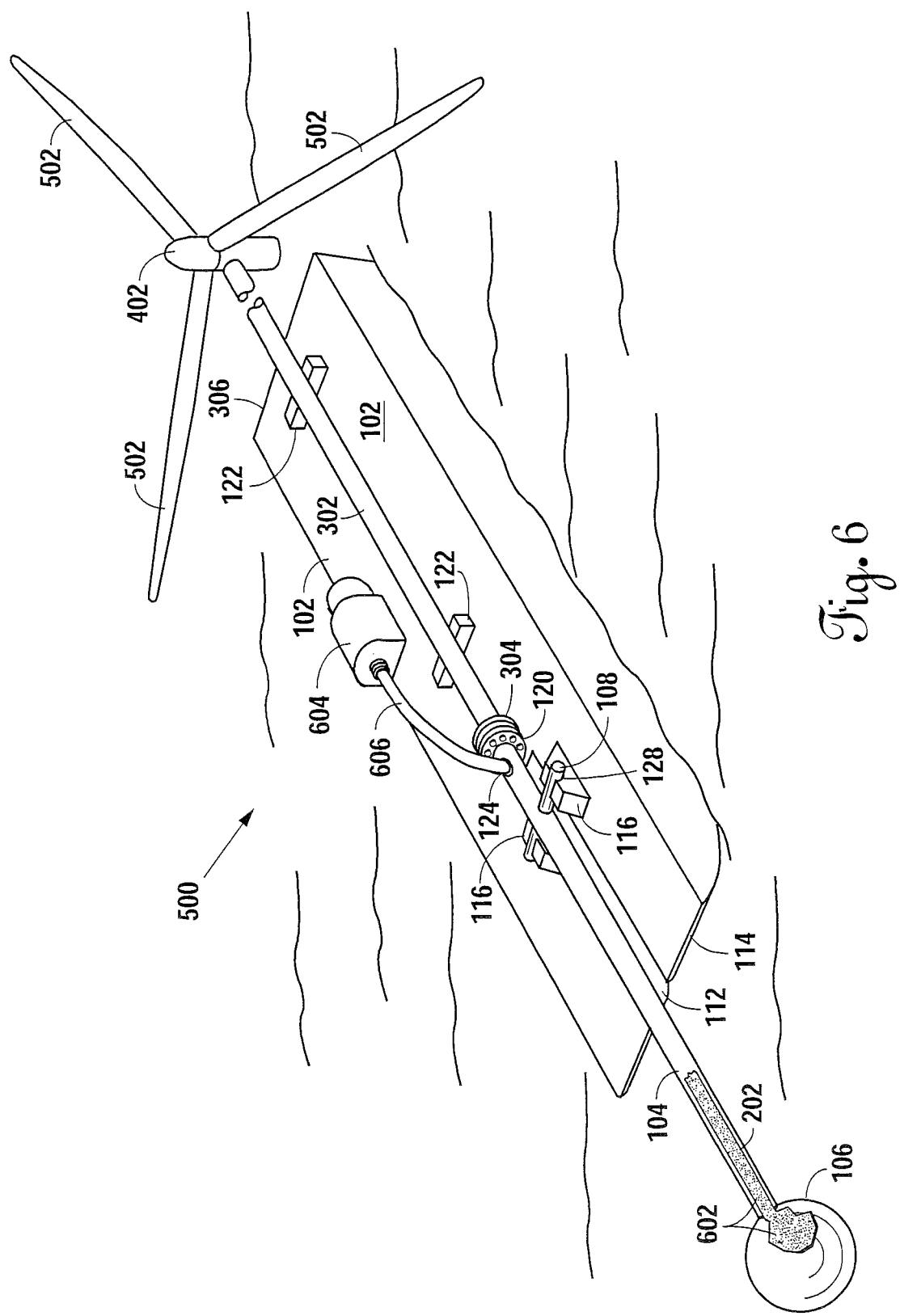
FIG. 6 is perspective view of the barge of FIG. 1 having a platform, turbine mast, turbine, and turbine blades disposed thereon, and showing a concrete pump placing ballast material in an opening in the platform.
Figure 7:
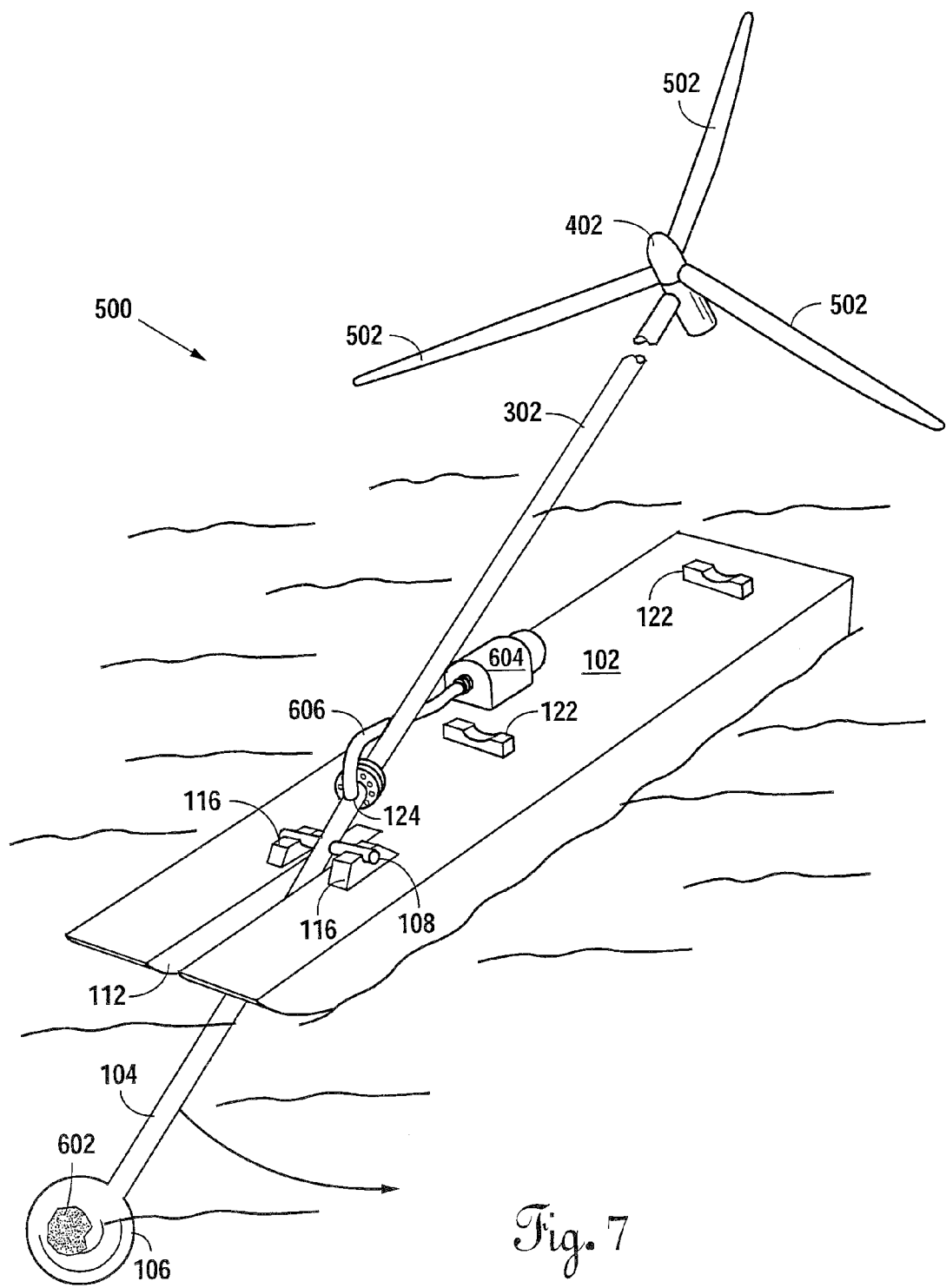
FIG. 7 is a perspective view of the barge of FIG. 1 having an offshore wind turbine assembly rotating toward an upright position.

Platform 104 may be supported on barge 102 by trunnion support 116 and temporary support 110. Temporary support 110 may include a notch (not shown) similar to notches 118 on mast supports 122, which may be sized to receive a portion of platform 104 and hold platform 104 in a stable position on barge 102. Temporary support 110 may be removable to allow platform 104 to rotate into the upright position, as shown in FIGS. 6-8.

Barge 102 may be any suitable barge and may be sized appropriately with respect to the dimensions of the desired offshore wind turbine assembly. For example, barge 102 may be between 400 and 500 feet long and between 60 and 80 feet wide. When barge 102 is docked for construction of the offshore wind turbine assembly 500 (see, e.g., FIGS. 1 and 3-5), a side 126 of barge 102 may contact the dock or dock bumpers (not shown) and a center of barge 102 may be approximately 45 feet from the dock, thus allowing cranes of standard boom height and radius and other standard equipment to perform most, if not all, of the construction work necessary to assemble offshore wind turbine assembly 500. Offshore wind turbine assembly 500 may be partially or completely constructed at a dock before transport to the installation site. In some embodiments, some of ballast material 602 may be inserted in platform 104 (as discussed in more detail below in connection with FIG. 6) while barge 102 is docked.

Trunnion 108 may project from an outer surface of platform 104 and may be an integral part of platform 104 or may be attached to platform 104 by welding, mechanical fasteners or another fastening method. Trunnion support 116 may be shaped to receive a portion of trunnion 108 and may include a notch 128 sized to receive trunnion 108. Trunnion 108 may be removably and rotatably attached to trunnion support 116 or may rotatably rest in notch 128 due to the force of gravity on trunnion 108 and platform 104. Trunnion 108 may be rotatably connected to trunnion support 116 such that platform 104 may rotate from a horizontal position, as shown in FIG. 1, to an upright position, as shown in FIG. 8. Trunnion 108 may be permanently attached to platform 104, as shown in FIG. 2, or may be removable from platform 104 (not shown). In some embodiments, trunnion 108 may be permanently attached to trunnion support 116 and removably attached to platform 104. While trunnion 108 and trunnion support 116 are shown in the attached figures and described herein, any suitable means of rotatably and removably attaching platform 104 to barge 102 may be employed.

Platform 104 may include a cylindrical portion 130 and an equalizer 106 connected at a distal end 132 of cylindrical portion 130. Platform 104 may have a circular cross sectional shape, as shown in the attached figures, or may have any other suitable cross sectional shape, such as a rectangular, oval, or triangular cross sectional shape. Platform 104 may include a single cylindrical portion 130 or may include a plurality of cylindrical portions 130 (not shown), each connected to equalizer 106. In some embodiments, for example, two or more cylindrical portions 130 may extend from equalizer 106 to connection interface 120. In some embodiments, a plurality of cylindrical portions 130 may be interconnected by a truss system (not shown) including a plurality of smaller cylindrical portions 130. As shown in FIG. 1, platform 104 may include a connection interface 120 at an end of cylindrical portion 130 opposite equalizer 106.

Equalizer 106 may be substantially spherical in shape, as shown in FIG. 1, or may have a frusto-conical shape, a rectangular shape, an oval shape, or any other shape that allows for a large interior volume. In some embodiments, equalizer 106 may include an internal equalizer volume 204 (as shown in FIG. 2) which may house ballast material 602 (see FIG. 6). Equalizer 106 may be sized such that a sufficient amount of ballast material 602 may be contained therein to tilt offshore wind turbine assembly 500 about trunnion 108 and lower the overall center of gravity of offshore wind turbine assembly 500 in its upright position.

Turning now to FIGS. 2 and 2A, platform 104 and equalizer 106 may be hollow and may have a substantially uniform wall thickness 210. In some embodiments, wall thickness 210 may vary in equalizer 106 and/or platform 104, for example, to account for anticipated stresses due to environmental forces acting on offshore wind turbine assembly 500.

Figure 9:
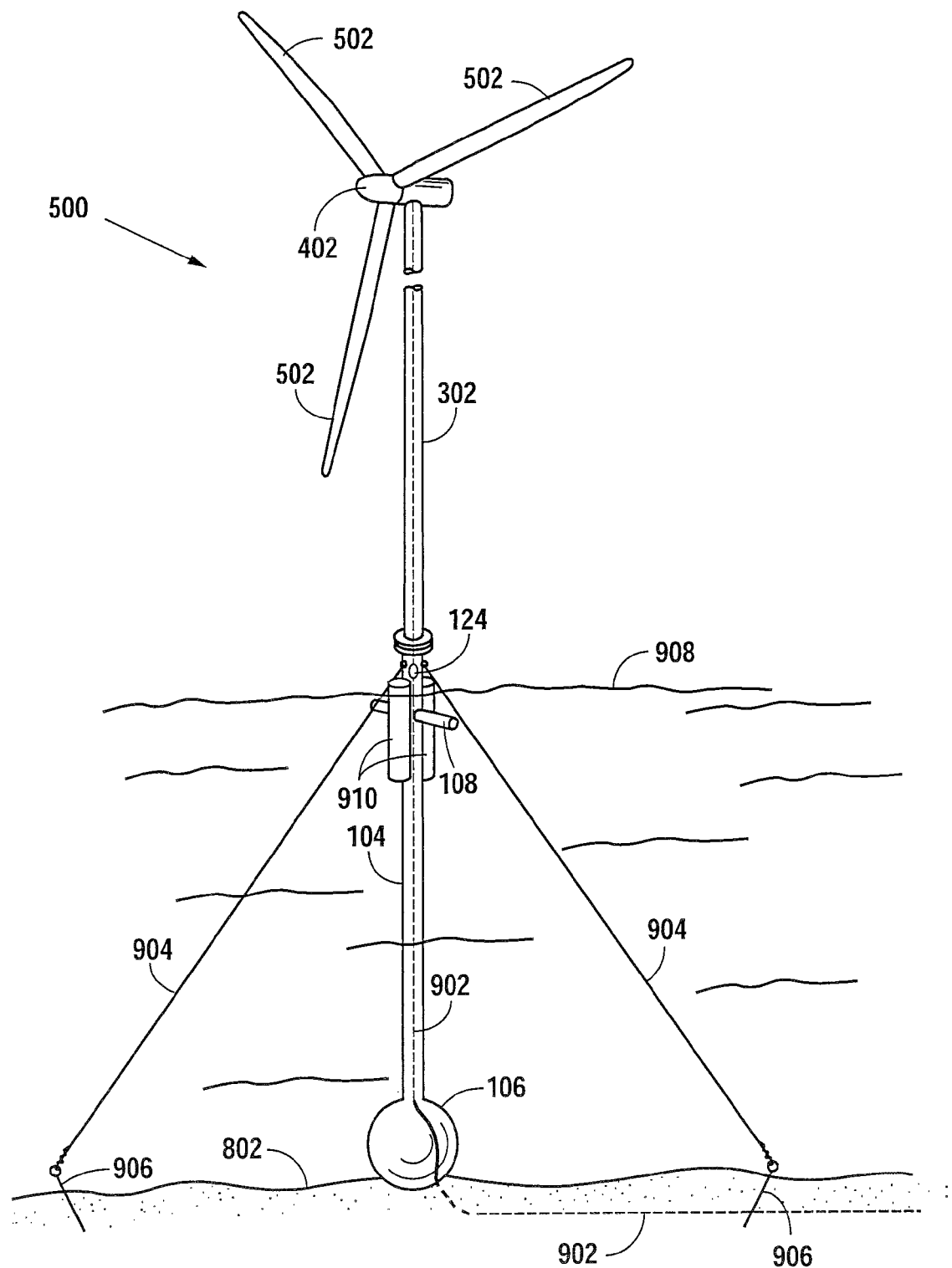
FIG. 9 is a perspective view of an offshore wind turbine assembly installed on the sea floor.

Platform 104 may also include an opening 124 and an internal tube 202. Opening 124 may extend through wall thickness 210 and may allow material to be inserted into internal tube 202. Opening 124 may be located on platform 104 such that it is above a water line 908 when offshore wind turbine assembly 500 is installed at an installation site, as shown in FIG. 9. Opening 124 may allow material, such as ballast material 602 as shown in FIG. 6, to be inserted into internal tube 202.

Internal tube 202 may connect with opening 124 and run through internal volume 206 of platform 104. Internal tube 202 may connect with internal equalizer volume 204 and allow material, such as ballast material 602, to enter through opening 124 and travel through internal tube 202 to internal equalizer volume 204. Internal tube 202 may connect with an opening 216 in wall 208 to allow ballast material 602 to pass from internal tube 202 to internal equalizer volume 204. Thus, as shown in FIG. 6, a material, such as ballast material 602, may be pumped into opening 124, travel through internal tube 202, pass through opening 216 in wall 208, and enter internal equalizer volume 204.

Referring again to FIGS. 2 and 2A, platform 104 may include an annular sealed volume 212 defined by wall 208, a second wall 214, an interior surface of wall thickness 210, an exterior surface of internal tube 202, and a cover or other seal (not shown) on opening 124. Sealed volume 212 may include air or other suitable gas and may provide a buoyant force when platform 104 is located in water. Sealed volume 212 may be sealed such that water and other substances may not enter sealed volume 212. In some embodiments, sealed volume 212 may be filled with a low density material, such as low density foam (not shown). A cover (not shown) may be secured to opening 124 by any suitable means and may seal opening 124 so that water and other materials may not enter opening 124. Opening 124 may be sealed after the desired amount of material has been placed in internal equalizer volume 204. A cover (not shown) may be removable or permanently secured to opening 124 by welding, adhesive, friction-fit or any other suitable means. Thus, platform 104 may comprise a unitary, buoyant column extending from equalizer 106 to a base of turbine mast 302. In some embodiments, in addition to the buoyant force provided by a unitary, buoyant platform 104, buoyancy tanks 910 (see FIGS. 9, 11, and 13) may provide an additional buoyant force.

FIG. 2A shows a close-up, partially cut-away view of a portion of platform 104 which shows internal tube 202, sealed volume 212 and wall thickness 210. Although internal tube 202 is shown such that a central, longitudinal axis of internal tube 202 aligns with a central, longitudinal axis of platform 104, internal tube 202 may be placed at any position within platform 104, such as, for example, against an internal wall of platform 104 (not shown). Although one internal tube 202 is shown, a plurality of internal tubes 202 may be included in some embodiments, each of which may be in fluid communication between internal equalizer volume 204 and one or more openings 124.

Although wall 208 is located at distal end 132 in FIG. 2, in some embodiments, wall 208 may be located a designated distance from distal end 132 in platform 104. Sealed volume 212 may still be defined by wall 208, second wall 214, an interior surface of wall thickness 210, an exterior surface of internal tube 202, and a cover or other seal for opening 124, and may be a smaller volume due to the placing of wall 208 at a designated distance from distal end 132. Wall 208 may be placed a specified distance from distal end 132, and internal tube 202 may be shortened by the specified distance so that internal tube 202 still intersects wall 208 at opening 216 in wall 208. When material, such as ballast material, is placed within opening 124, it may travel through internal tube 202, through opening 216 in wall 208 to internal volume 206 and then to internal equalizer volume 204. Once internal equalizer volume 204 has been filled, internal volume 206 may begin to fill with material. Thus, internal equalizer volume 204 and a portion of internal volume 206 may be filled with material which may increase the volume and weight of material that may be placed within offshore wind turbine assembly 500.

In some embodiments, ballast material 602 may be pumped into internal tube 202 until internal equalizer volume 204 is partially or completely filled. In some embodiments, ballast material 602 may be pumped into internal tube 202 until both internal tube 202 and internal equalizer volume 204 are filled.

In some embodiments, platform 104 may not include internal tube 202 and wall 208. Thus, opening 124 may open directly into internal volume 206. Thus, when material is poured or pumped into opening 124, the material may enter internal volume 206 and flow through internal volume 206 to internal equalizer volume 204. A volume of material may be supplied through opening 124 to partially or completely fill internal equalizer volume 204. In some embodiments, a volume of material may be supplied through opening 124 to fill internal equalizer volume 204 and to fill a portion of internal volume 206. The portion of internal volume 206 that does not contain material may then be sealed to provide a buoyant force when offshore wind turbine assembly 500 is placed in water. Alternatively, internal volume 206 may be filled completely with ballast material, and the desired buoyant force may be supplied by buoyancy tanks 910 as described below.

Referring now to FIG. 3, connection interface 120 of platform 104 may be configured to connect to a connection interface 304 on a turbine mast 302. Connection interface 120 and connection interface 304 may be any suitable means of connecting platform 104 to turbine mast 302 and may be of a larger diameter than cylindrical portion 130 and turbine mast 302. In some embodiments, connection interfaces 120 and 304 may include flanges which may be connected using bolts 308 which may be periodically inspected. Alternatively, connection interfaces 120 and 304 may be attached by welding or any other suitable means. Such connection, as with the other construction necessary to assemble offshore wind turbine assembly 500, may be made while barge 102 is docked. A central, longitudinal axis of turbine mast 302 may align with a central, longitudinal axis of platform 104. Turbine mast 302, like platform 104, may have any suitable cross sectional shape. Turbine mast 302 may have a cross sectional shape similar to or different from that of platform 104 and may be of a diameter or size similar to or different from that of platform 104. Turbine mast 302 may extend past an edge 306 of barge 102 and may be supported on mast supports 122. Turbine mast 302 may be configured to fit within notches 118 (see FIG. 1) of mast supports 122.

Turbine mast 302 may be sized as needed; for example, in some embodiments, turbine mast 302 may be approximately 300 feet in length and may be a hollow, metal cylinder. Both turbine mast 302 and platform 104 may be made of steel or other suitable material and may be shaped generally as hollow cylinders.

Figure 4:
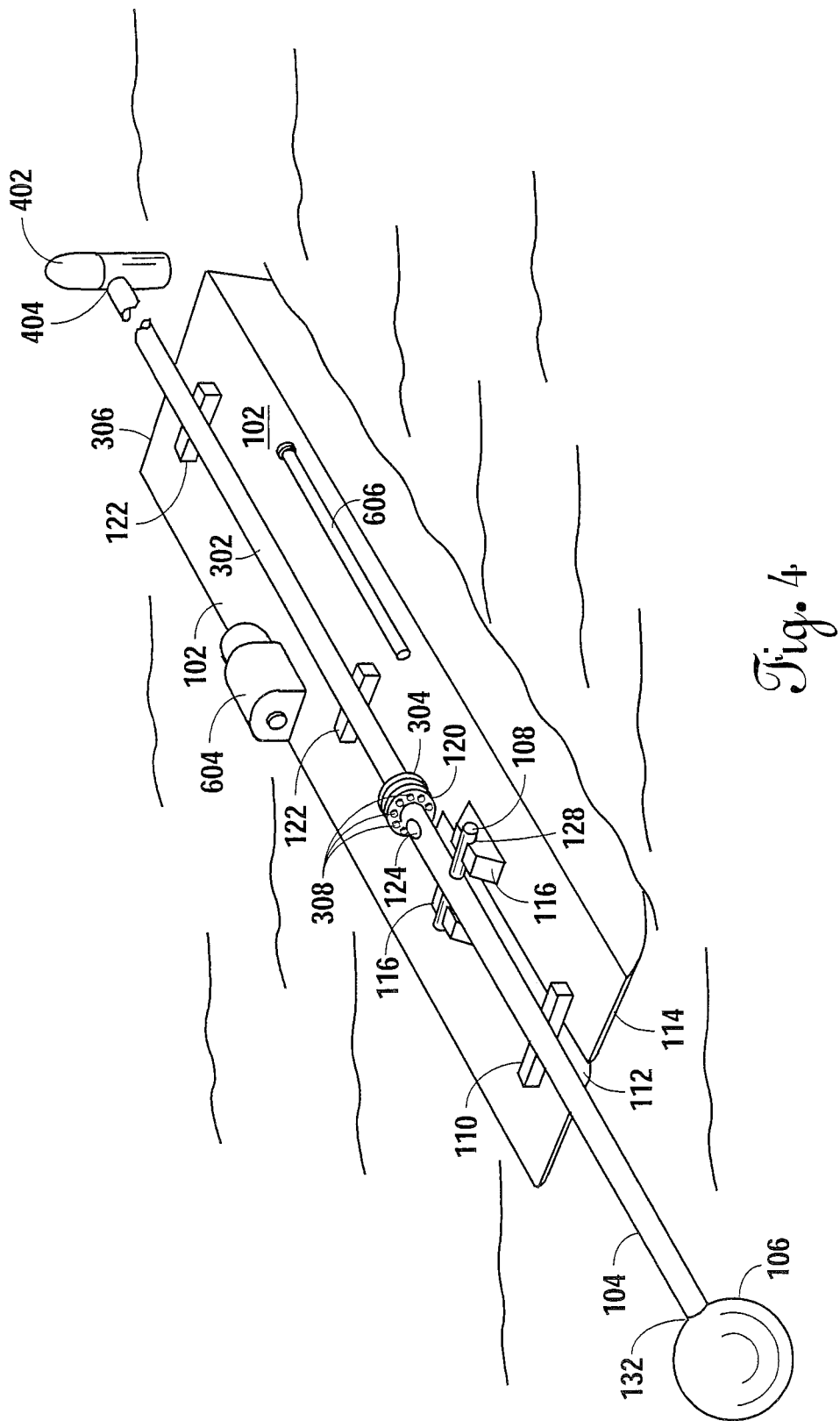
FIG. 4 is a perspective view of the barge of FIG. 1 having a platform and turbine mast disposed thereon and a turbine installed on an end of the turbine mast.

As shown in FIG. 4, turbine 402 may be connected to a distal end 404 of the turbine mast 302. Turbine 402 may be any suitable turbine and may weigh approximately 200,000 lbs, for example, or any other suitable weight. As stated above, installation of turbine 402 may take place while barge 102 is docked.

Figure 5:
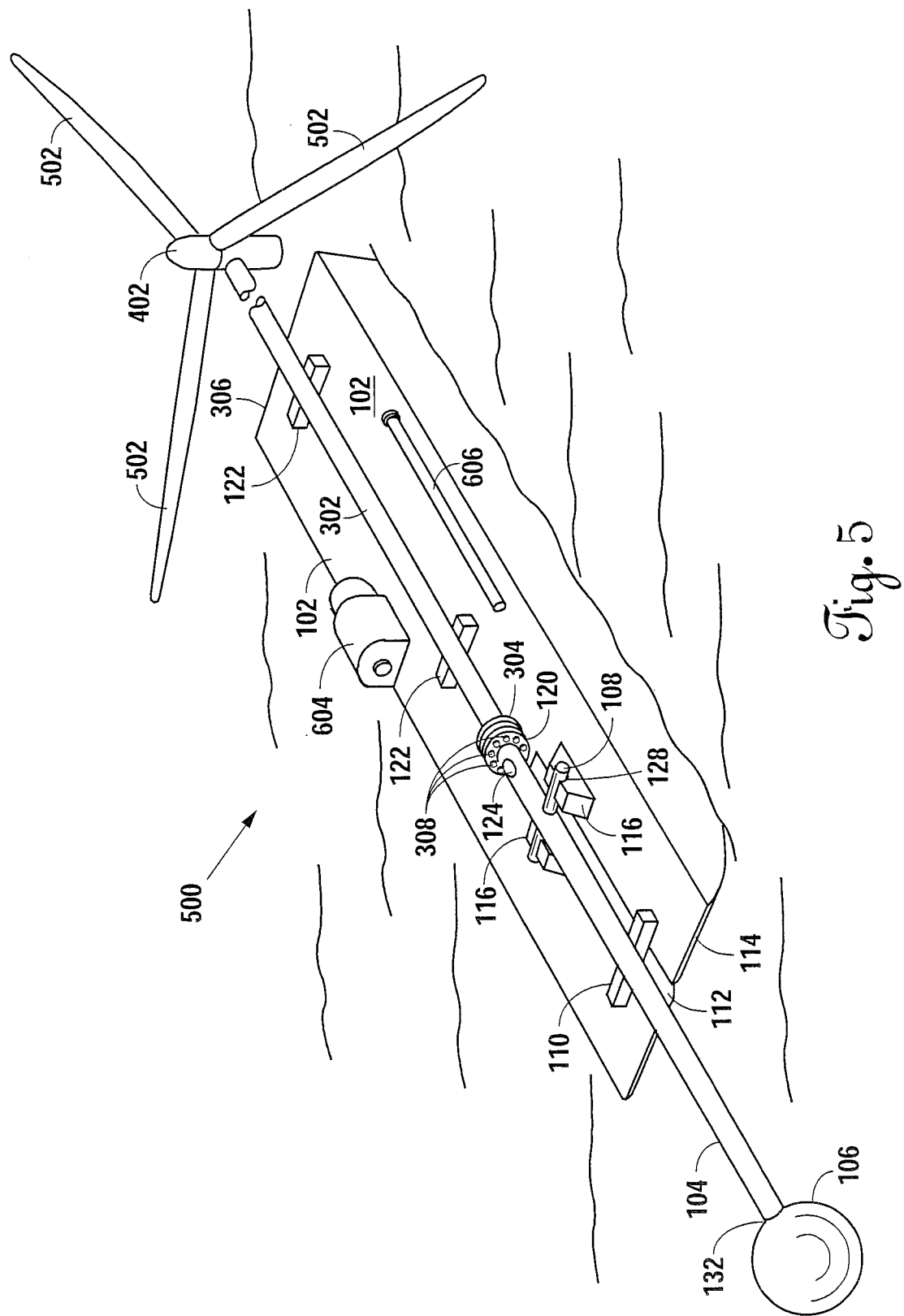
FIG. 5 is a perspective view of the barge of FIG. 1 having a platform and turbine mast disposed thereon and turbine blades installed on a turbine.

As shown in FIG. 5, turbine blades 502 may be attached to turbine 402. Although three turbine blades 502 are shown, any number of turbine blades 502 may be attached to turbine 402. In addition, any suitable type of turbine blade 502 may be attached to turbine 402. As stated above, turbine blades 502 may be installed on turbine 402 while barge 102 is docked.

As shown in FIG. 6, ballast material 602, such as high-density concrete or other suitable material, may be placed within opening 124 in platform 104. Ballast material 602 may enter platform 104 through opening 124 and may travel through platform 104 to internal equalizer volume 204 of equalizer 106. As described above, ballast material 602 may travel through internal tube 202 or may travel directly through internal volume 206 if internal tube 202 is not present. Any suitable mechanism and method may be used to place ballast material 602 within opening 124. In some embodiments, a concrete pump 604 may pump ballast material 602 through a hose 606 to opening 124. In addition, any suitable ballast material 602 may be used. In some embodiments, ballast material 602 may be a high-density concrete of between about 300 and 400 pounds per cubic foot ("PCF"), for example. Any suitable density may be used. Temporary support 110 (shown in FIG. 1) may be removed from below platform 104 to allow platform 104 to begin to rotate to the upright position when a sufficient amount of ballast material 602 is pumped into internal equalizer volume 204. Opening 124 may be located near trunnion 116 so that hose 606 may remain connected to opening 124 as offshore wind turbine assembly 500 rotates from a horizontal position to an upright position. Prior to the addition of sufficient ballast material 602, the center of gravity of offshore wind turbine assembly 500 may be located on the turbine side of trunnion 108.

Referring now to FIG. 7, offshore wind turbine assembly 500 may begin to transition from a horizontal position, as shown in FIG. 6, to an upright position, as shown in FIG. 8, as ballast material 602 is added to equalizer 106. Trunnion 108 may rotate on the trunnion support 116 to allow offshore wind turbine assembly 500 to rotate to an upright position. As discussed earlier, barge 102 may include an opening 112 positioned between the trunnion supports 116 which may allow offshore wind turbine assembly 500 to rotate to the upright position by allowing platform 104 to pass within opening 112.

In some embodiments, offshore wind turbine assembly 500 may begin to rotate when the center of gravity of offshore wind turbine assembly 500 passes trunnion 108 as ballast material 602 is delivered to equalizer 106. Barge 102 may be located over the installation site. Additional amounts of ballast material 602 may be added to internal equalizer volume 204 through opening 124 so that offshore wind turbine assembly 500 approaches an upright position. Finally, sufficient ballast material 602 may be added to internal equalizer volume 204 to rotate offshore wind turbine assembly 500 to the upright position.

As shown in FIG. 8, equalizer 106 may contact a sea floor 802 when offshore wind turbine assembly 500 is in the upright position. A distance between trunnion 108 and a lower portion of equalizer 106 may be sized such that the lower portion of equalizer 106 contacts sea floor 802 when offshore wind turbine assembly 500 is in the upright position and is still engaged with barge 102 via trunnion 108. In some embodiments, the distance between trunnion 108 and the lower portion of the equalizer 106 may be sized such that the lower portion of the equalizer 106 does not contact sea floor 802 when offshore wind turbine assembly 500 is in the upright position. Rather, the lower portion of equalizer 106 may be a desired distance above sea floor 802 when offshore wind turbine assembly 500 is in the upright position. Barge 102 may be capable of ballasting a portion of barge 102 in order to lower barge 102 with respect to water line 908 (see FIG. 9). Thus, equalizer 106 may contact sea floor 802 when barge 102 is lowered due to the addition of a ballast material. In either embodiment, barge 102 may be ballasted in order to relieve stresses at the intersection between trunnion 108 and trunnion support 116 to allow trunnion 108 to be removed from trunnion support 116, or to allow trunnion 108 to be removed from platform 104. If another rotatable, removable connection is used to connect offshore wind turbine assembly 500 to barge 102, barge 102 may be ballasted to relieve the stress in that removable connection so that offshore wind turbine assembly 500 may be removed from barge 102.

As shown in FIG. 9, offshore wind turbine assembly 500 may be removed from barge 102 and may remain in the upright position in the sea water, although some movement or tipping of the offshore wind turbine assembly 500 is anticipated as discussed in more detail below. As discussed above, the length of platform 104 may be configured to be slightly longer than the depth of the water so that opening 124 is located above water line 908. In some embodiments, offshore wind turbine assembly 500 may be installed at installation sites at which the water is less than a desired depth, such as three hundred (300) feet deep, for example. Of course, offshore wind turbine assembly 500 may be sized for any desired depth.

Equalizer 106 may be spherical in shape and may contact sea floor 802. Thus, the weight of offshore wind turbine assembly 500 may rest on sea floor 802 due to the contact between equalizer 106 and sea floor 802. Equalizer 106 may be located at distal end 132 of platform 104 and may act as a base for the other elements of offshore wind turbine assembly 500.

Turbine 402 may generate electricity in response to wind acting on turbine blades 502, which may cause rotation of turbine 402. In some embodiments, an electrical line 902 may connect turbine 402 to an electrical facility on land or offshore (not shown). In the embodiment of FIG. 9, for example, an electrical line 902 may run from turbine 402, through an interior volume of turbine mast 302, through internal volume 206 of platform 104 and out of an opening in platform 104. Electrical line 902 may then run along an outside surface of equalizer 106 and along sea floor 802 to an electrical facility (not shown). In some embodiments, electrical line 902 may run from turbine 402 to sea floor 802 on an exterior surface of turbine mast 302, platform 104, and equalizer 106. Electrical line 902 may be any suitable electrical line which may transport electricity from turbine 402 to an electrical facility.

In some embodiments, guide lines 904 may be connected to platform 104, as shown in FIG. 9, to provide additional stability to offshore wind turbine assembly 500. Guide lines 904 may be connected to any portion of offshore wind turbine assembly 500 such as, for example, a portion of turbine mast 302. In the embodiment of FIG. 9, guide lines 904 are connected to an upper end of platform 104 and may be anchored to sea floor 802 by anchors 906. The distance along sea floor 802 between anchors 906 and the installation site of equalizer 106 may vary depending on, for example, the forces to be experienced by offshore wind turbine assembly 500. Anchors 906 may be any suitable anchoring mechanism, such as, for example, suction piles, mooring anchors, driven piles, or drag embedded vertical load anchors (VLAs). Although two guide lines 904 are shown in FIG. 9, any number of guide lines 904 may be connected with offshore wind turbine assembly 500 and anchored to sea floor 802. Some embodiments may not have any guide lines 904 or anchors 906.

Figure 13:
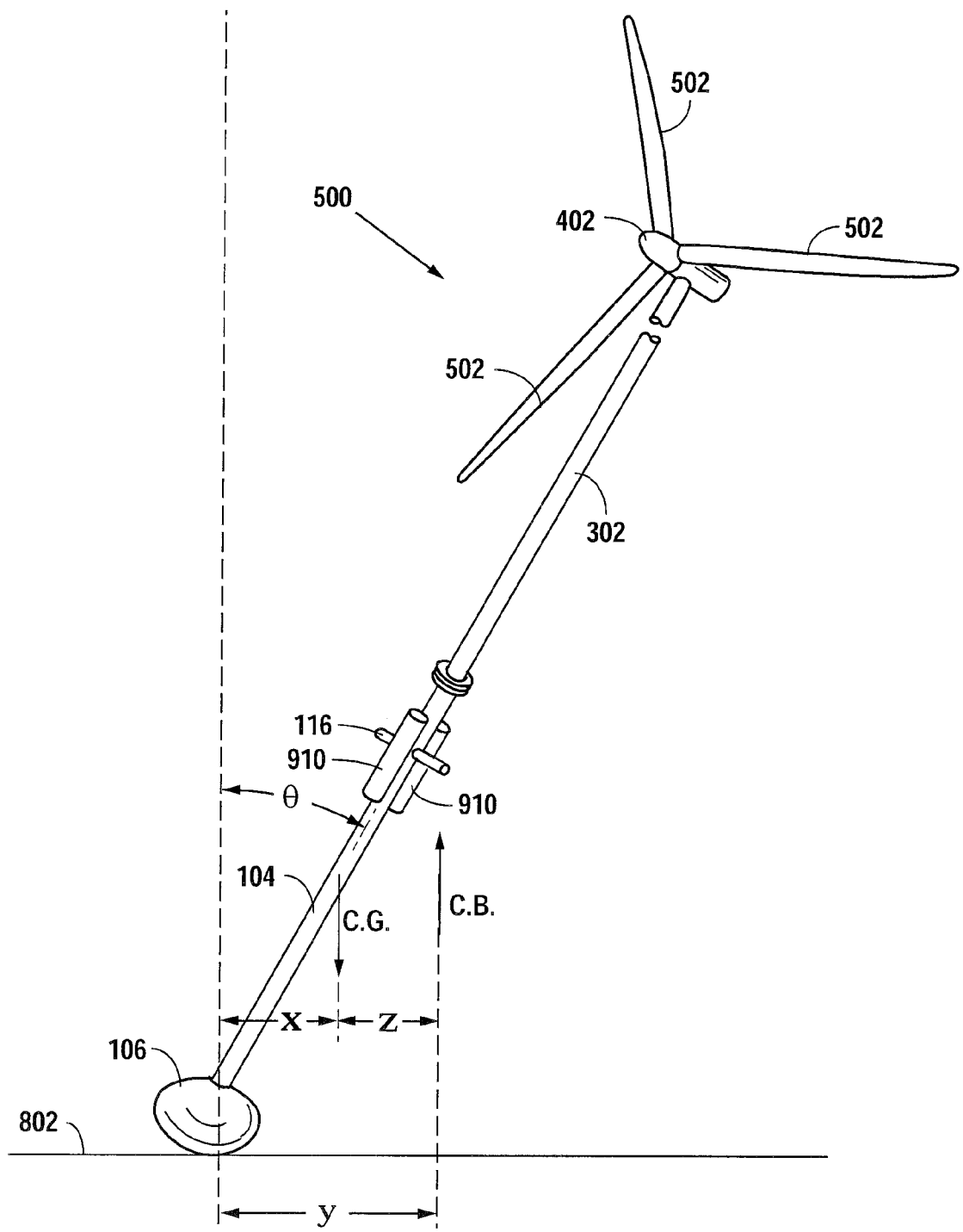
FIG. 13 is a perspective view of an offshore wind turbine assembly in a tilted position.

Offshore wind turbine assembly 500 may remain in a substantially upright position due to the weight of ballast material 602 in equalizer 106, which causes offshore wind turbine assembly 500 to have a low center of gravity, and the buoyant force caused by the water displaced by platform 104. The low center of gravity and buoyant force allow offshore wind turbine assembly 500 to quickly return to an upright position if offshore wind turbine assembly 500 is moved from an upright position, as shown in FIG. 13. In addition, any number of buoyancy tanks 910 may be connected to platform 104 to increase the total buoyant force acting on offshore wind turbine assembly 500. In some embodiments, buoyancy tanks 910 may be sealed tanks of from about 35 to 40 feet in length and about 5 to 10 feet in diameter, for example. Of course, any suitable size may be used for buoyancy tanks 910.

As shown in the calculations below, the buoyant force may overcome forces which may act on the offshore wind turbine assembly 500 in order to return the offshore wind turbine assembly 500 to the upright position. Thus, some movement of the offshore wind turbine assembly 500 is anticipated. However, equalizer 106 may generally remain at the installation site, although some movement along the sea floor 802 may occasionally occur.

Figure 10:
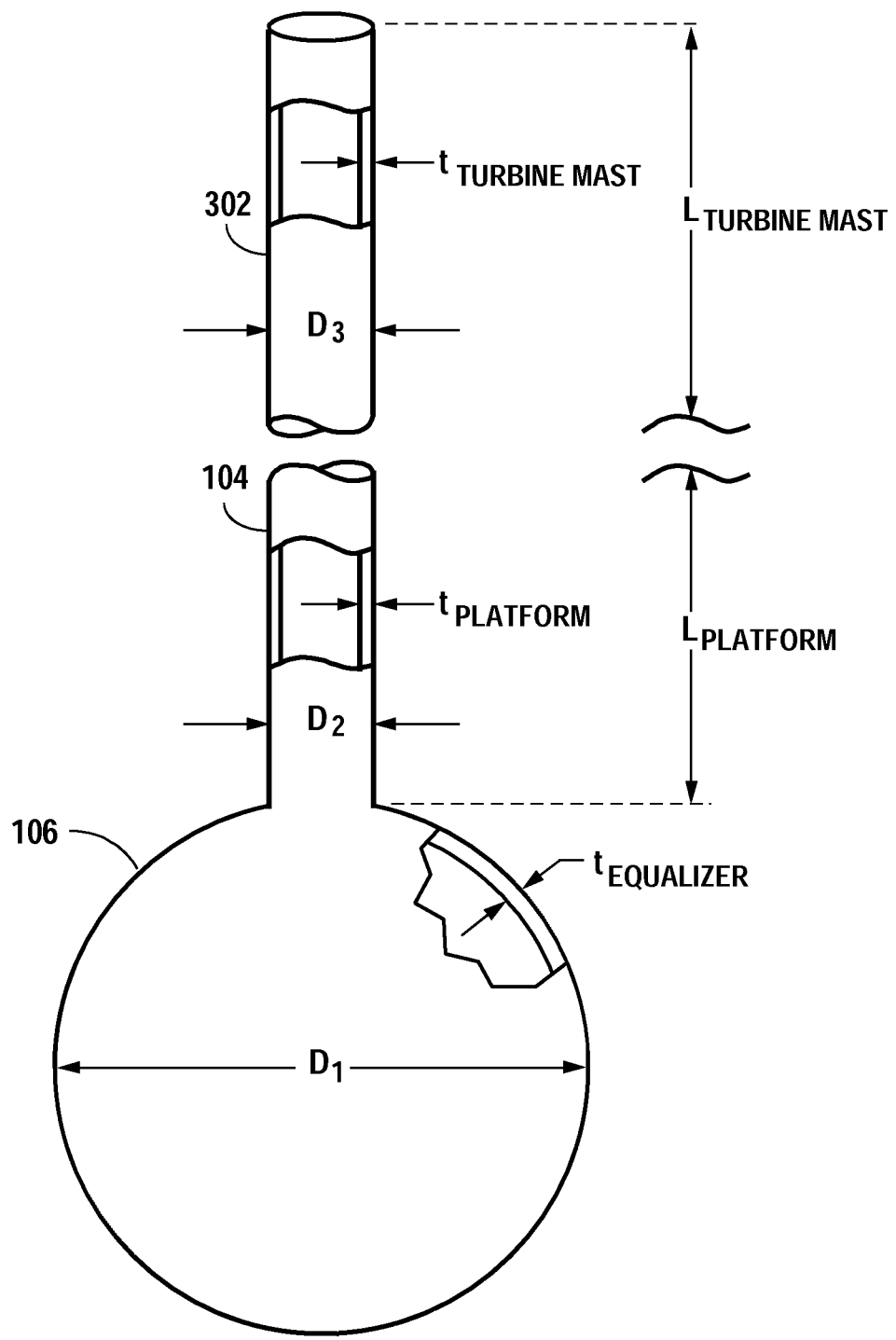
FIG. 10 is a front elevational view of an equalizer and a portion of a platform and turbine mast.

The following example dimensions, calculated values, and equations are given as examples of possible dimensions, calculated values and equations for use in connection with offshore wind turbine assembly 500. Of course, other dimensions, calculated values, and equations may be used as appropriate for any given embodiment, as will be understood by persons of ordinary skill in the art. As shown in FIG. 10, equalizer 106 may have a diameter $D_1$ and a wall thickness $t_{Equalizer}$, platform 104 may have a diameter $D_2$ and a wall thickness $t_{Platform}$, and turbine mast 302 may have a diameter $D_3$ and a thickness $t_{Turbine\ Mast}$. The weight of equalizer 106 may be calculated using the following formula:

$$W_{Equalizer} = \frac{\pi}{6}(D_1^3 - (D_1 - t_{Equalizer})^3)\rho_{steel}$$

In some embodiments, equalizer 106 may be other suitable shapes, as described above, and the weight of those shapes may be calculated using appropriate volume equations and material densities. The weight of internal equalizer volume 106 when filled with ballast material 602 may be calculated using the following formula:

$$W_{Internal\ Equalizer\ Volume} = \frac{\pi}{6}(D_1 - t_{Equalizer})^3 \rho_{Ballast\ Material}$$

Thus, the total weight of equalizer 106 when filled with ballast material 602 is calculated using the following formula:

$$W_{Equalizer\ Total} = W_{Internal\ Equalizer\ Volume} + W_{Equalizer}$$

In one example embodiment, if $D_1$ is 40 feet, $t_{Equalizer}$ is 1 inch, $\rho_{steel}$ is 490 PCF and ballast material is heavy weight concrete with a $\rho_{ballast\ material}$ of 300 PCF, $W_{Equalizer}$ is approximately KIPS, $W_{Internal\ Equalizer\ Volume}$ is approximately 9,990 KIPS and $W_{Equalizer\ Total}$ is approximately 10,093 KIPS.

The weight of platform 104 and turbine mast 302 may be calculated using the following formulas:

$$W_{Platform} = \pi(D_2 - t_{Platform})t_{Platform}L_{Platform} * \rho_{steel}$$

$$W_{Turbine\ Mast} = \pi(D_3 - t_{Turbine\ Mast})t_{Turbine\ Mast} L_{Turbine\ Mast} * \rho_{steel}$$

where $D_2$ is the diameter of platform 104, $D_3$ is the diameter of turbine mast 302, $t_{Platform}$ is wall thickness 201, $t_{Turbine\ Mast}$ is the wall thickness of turbine mast 302, $L_{Platform}$ is the length of platform 104, and $L_{Turbine\ Mast}$ is the length of turbine mast 302. Thus, if $D_2$ is 38 feet, $D_3$ is 15 feet, $t_{Platform}$ is 1 inch, $t_{Turbine\ Mast}$ is 0.75 inch, $L_{Platform}$ is 100 feet, and $L_{Turbine\ Mast}$ is 250 feet, then $W_{platform}$ is 486 KIPS and $W_{Turbine\ Mast}$ is 360 KIPS. In addition to these weights, turbine 402 may weigh 200 KIPS, for example, and the combined weight of turbine blades 502 may be 50 KIPS, for example.

The above calculated and stated weights may be used to calculate a combined weight, $W_{Total}$, of offshore wind turbine assembly 500 which, for purposes of general calculations, may act at the center of mass of offshore wind turbine assembly 500. In this example, $W_{Total}$ is approximately 11,189 KIPS.

Figure 11:
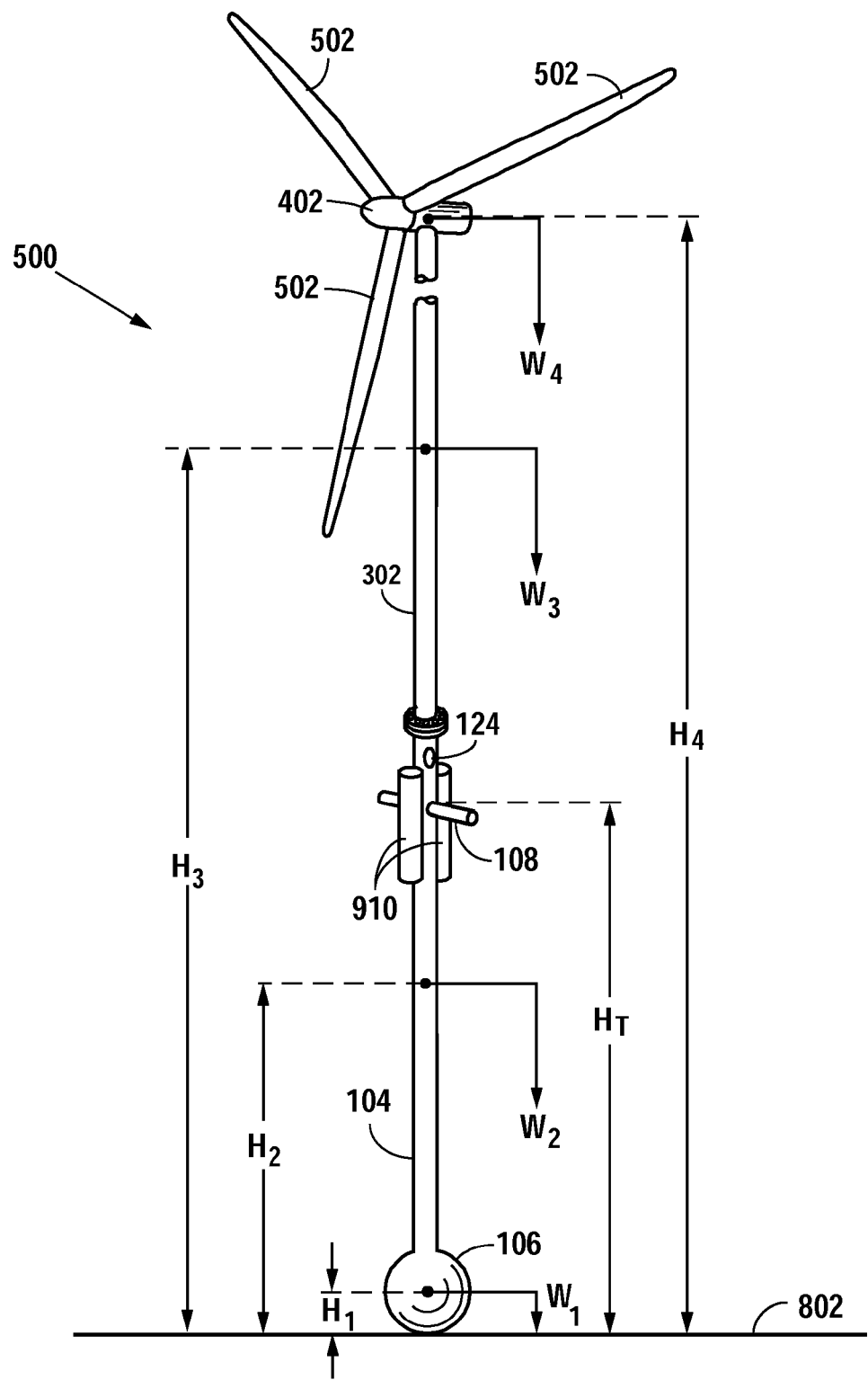
FIG. 11 is a perspective view of an offshore wind turbine assembly showing weights and distances used to calculate a location of the center of gravity of the offshore wind turbine assembly.

Referring to FIG. 11, the distance from a lower portion of equalizer 106 to the center of mass of the offshore turbine assembly 500 may be calculated using the following formula:

$$y_{C.M.} = \frac{W_{Equalizer\ Total} * H_1 + W_{Platform} * H_2 + W_{Turbine\ Mast} * H_3 + W_{Turbine\ \&\ Blades} * H_4}{W_{Equalizer\ Total} + W_{Platform} + W_{Turbine\ Mast} + W_{Turbine\ \&\ Blades}}$$

where $W_{Turbine\ \&\ Blades}$ is the combined weight of turbine 402 and turbine blades 502, $H_1$ is the distance from a center of equalizer 106 to sea floor 802, $H_2$ is the distance from a center of platform 104 to sea floor 802, $H_3$ is the distance from a center of turbine mast 302 to sea floor 802, and $H_4$ is the distance from a center of turbine 402 to sea floor 802. In some embodiments, platform 104 may be approximately 100 feet in height, turbine mast 302 may be approximately 250 feet in height, and turbine 402 may be approximately 380 feet above sea floor 802. Thus, if $W_{Equalizer\ Total}$ is 10,093 KIPS, $W_{Platform}$ is 486 KIPS, $W_{Turbine\ Mast}$ is 360 KIPS, $W_{Turbine\ \&\ Blades}$ is 250 KIPS, $H_1$ is 20 ft., $H_2$ is 90 ft., $H_3$ is 265 ft., and $H_4$ is 390 ft., then the distance from sea floor 802 to the center of mass of offshore wind turbine assembly 500, $y_{C.G.}$, is approximately 39 feet. A low center of mass may help offshore wind turbine assembly 500 remain in the upright position when encountering environmental forces.

Figure 12:
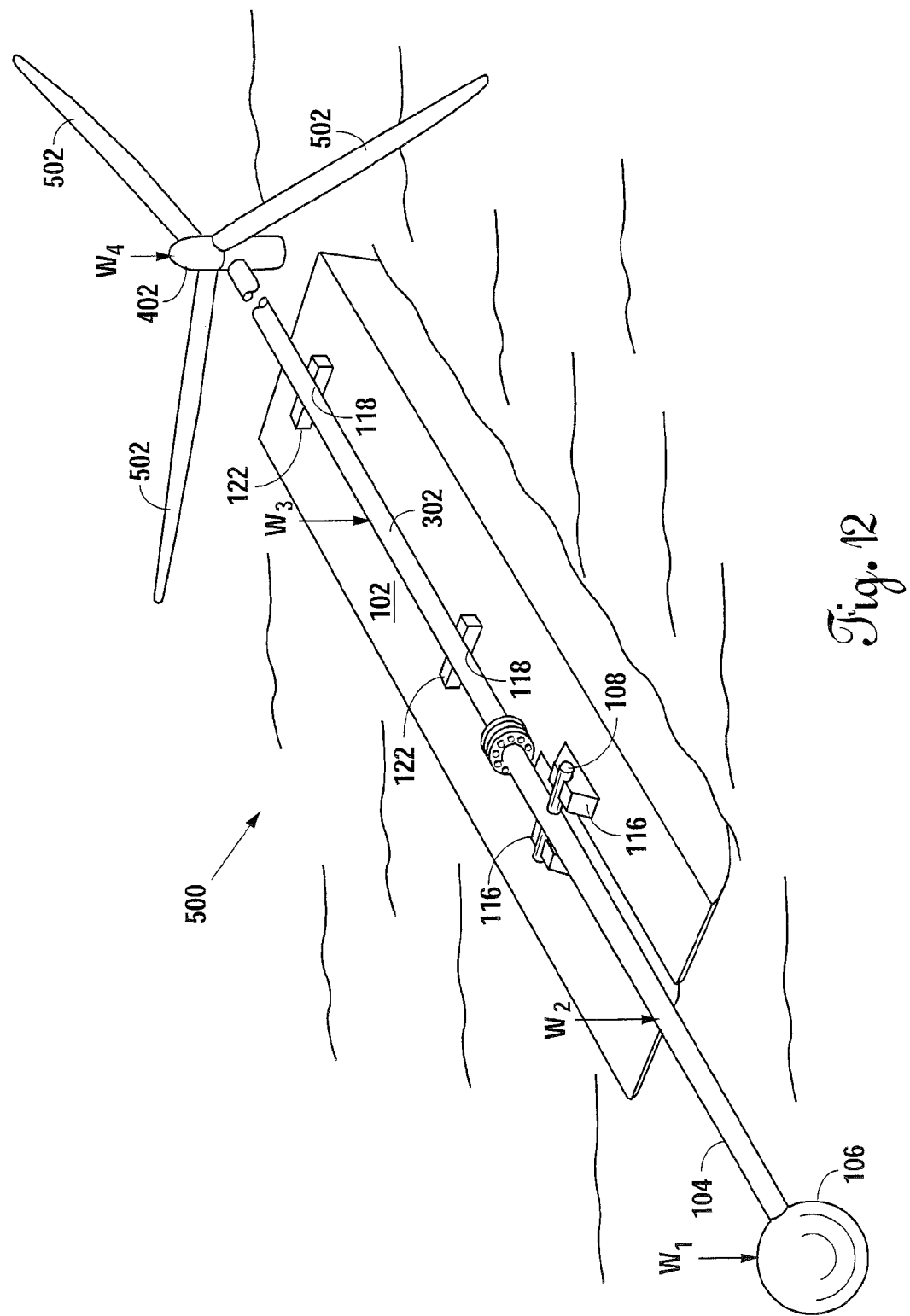
FIG. 12 is a perspective view of the barge and offshore wind turbine assembly of FIG. 5 showing weights used to calculate a tipping weight of the offshore wind turbine assembly.

Turning now to FIG. 12, the tipping weight of the fully assembled offshore wind turbine assembly 500 may be calculated using the following formula:

$$W_{Tipping\ Weight} = \frac{W_3(H_3 - H_T) + W_4(H_4 - H_T) - W_2(H_T - H_2)}{H_T - H_1}$$

where $W_{Tipping\ Weight}$ is the tipping weight of equalizer 106, $W_2$ is the weight of platform 104, $W_3$ is the weight of turbine mast 302, and $W_4$ is the weight of turbine 402 and turbine blades 502. Thus, if platform 104 is 100 feet in height, turbine mast 302 is 250 feet in height, turbine 402 is 390 feet above sea floor 802, trunnion 180 is 130 feet above sea floor 802, $W_{Platform}$ is 486 KIPS, $W_{Turbine\ Mast}$ is 360 KIPS, turbine 402 weighs 200 KIPS, and turbine blades weigh 50 KIPS, then $W_{Tipping\ Weight}$ is approximately 856 KIPS. Thus, in this example, $W_{Equalizer\ Total}$ (10,093 KIPS) is greater than the needed $W_{Tipping\ Weight}$ (856 KIPS) and offshore wind turbine assembly 500 may begin to rotate from the horizontal position to the upright position before equalizer 106 has been completely filled with ballast material 602.

The required section modulus may be calculated to help determine structural requirements for portions of offshore wind turbine assembly 500 that will be exposed to high weights (stresses) when offshore wind turbine assembly 500 is moved from a horizontal to an upright position. The required section modulus for platform 104 may be calculated using the following formula:

$$S_{Req'd} = \frac{m}{0.6F_y}$$

where m is the moment of platform 104 and $F_y$ is the yield strength of the material from which platform 104 is made. The moment of platform 104 may be calculated using the following formula:

$$m = W_{Tipping\ Weight}(H_T - H_1) + W_{Platform}(H_T - H_2)$$

Thus, if $W_{Tipping\ Weight}$ is 856 KIPS, $W_{Platform}$ is 486 KIPS, $H_1$ is 20 feet, $H_2$ is 90 feet, $H_T$ is 130 feet, and $F_y$ is the yield strength of steel, e.g. 50 KIPS, then m may be about 113,600 ft*KIPS and $S_{Req'd}$ may be about 45,440 in.³. The section modulus of platform 104 may be calculated using the following formula:

$$S_{Platform} = \frac{\pi(D_2^4 - (D_2 - t_{Platform})^4)}{32D_2}$$

Thus, if $D_2$ is 38 feet and $t_{Platform}$ is 1 inch, then $S_{Platform}$ is approximately 47.1 ft.³ (81,389 in.³). Dimensions $D_2$, $D_3$, $t_{Platform}$ and $t_{Turbine\ Mast}$ may be adjusted in view of the actual and required section modulus.

Turning now to FIG. 13, the distance x is the lateral distance between a longitudinal, central axis of platform 104 when offshore wind turbine assembly 500 is in an upright position and the center of gravity ("C.G.") of offshore wind turbine assembly 500 when offshore wind turbine assembly is tilted at an angle θ. The distance y is the lateral distance between the longitudinal, central axis of platform 104 when offshore wind turbine assembly 500 is in an upright position and the center of buoyancy ("C.B.") of offshore wind turbine assembly 500 when offshore wind turbine assembly 500 is tilted at an angle θ. Finally, distance z is the lateral distance between C.G. and C.B. of offshore wind turbine assembly 500. The value of x may be calculated using standard geometric principles. For example, x may be calculated using the following formula:

$$x = y_{C.M.} * \sin\theta$$

Thus, in this example embodiment where $y_{C.G.}$ is 39 feet and θ is 20 degrees, x is approximately 13.3 feet.

The approximate buoyant force acting at C.B. may be calculated using the following equations. The approximate buoyant length of platform 104 which is under waterline 908 when offshore wind turbine assembly 500 is tilted at an angle θ may be calculated using the following equation:

$$L_{Platform\ Underwater} = \frac{H_{Waterline}}{\cos(\theta)} - D_1$$

Thus, where $H_{Waterline}$ is 138 feet, θ is 20 degrees and $D_1$ is 40 feet, $L_{Platform\ Underwater}$ is approximately 107 feet. The approximate buoyant force acting on platform 104 can be calculated using the following equation:

$$W_{C.B.} = \frac{\rho_{salt\ water} \pi D_2^2 L_{Platform\ Underwater}}{4}$$

Thus, if $\rho_{salt\ water}$ is 64.1 lbs./ft.³, $L_{Platform\ Underwater}$ is 107 feet and $D_2$ is 38 feet, then $W_{C.B.}$ is approximately 7,779 KIPS. $W_{C.B.}$ will act at C.B., which is located a distance y from a center of equalizer 106. The distance y may be calculated using the following equation:

$$y = \left(\frac{L_{Platform\ Underwater}}{2} + D_1\right) * \cos(90 - \theta)$$

Thus, if $L_{Platform\ Underwater}$ is 107 feet, $D_1$ is 40 feet, and θ is 20 degrees, then y is approximately 32 feet.

If $W_{Equalizer\ Total}$ is 10,093 KIPS, $W_{Platform}$ is 486 KIPS, $W_{Turbine\ Mast}$ is 360 KIPS, turbine 402 weighs 200 KIPS and the combined weight of turbine blades 502 is 50 KIPS, the weight acting at the center of gravity, $W_{C.G.}$, is the sum of these weights, or approximately 11,189 KIPS. Finally, the net moment force may be calculated using the following formula:

$$F_m = y_{C.B} \frac{W_{C.B.}}{\cos(20)} - y_{C.M} \frac{W_{C.G.}}{\cos(20)}$$

Thus, if $W_{C.B.}$ is 7,779 KIPS, $W_{C.G.}$ is 11,189 KIPS, $y_{C.B.}$ is 90 feet, and $y_{C.G.}$ is 39 feet, then $F_m$ is 280,665 KIPS*ft. and there is a positive restorative moment force imposed on offshore wind turbine assembly 500 when offshore wind turbine assembly 500 is tipped at a 20 degree angle that tends to restore assembly 500 to an upright position. This positive restorative moment force may be increased through the use of buoyancy tanks 910, as described above.

The embodiments described above are some examples of the current invention. Various modifications and changes of the current invention will be apparent to persons of ordinary skill in the art. Among other things, any feature described for one embodiment may be used in any other embodiment. The scope of the invention is defined by the claims that may be drawn to this invention, considering the doctrine of equivalents, and is not limited to the specific examples described herein.

What is claimed is:

1. A method of installing an offshore wind turbine assembly comprising:
    placing an elongated platform on a barge, said platform comprising a trunnion, a buoyant column comprising a first internal volume, an opening, an equalizer having a second internal volume, and a conduit in fluid communication with said opening and said second internal volume,
    said barge comprising an end, a rotational support for receiving said trunnion, a temporary support between said end and said rotational support, and an open passage extending from said end to a location proximate said rotational support,
    said platform resting on said temporary support in a first position;
    attaching an elongated turbine mast to said platform;
    attaching a turbine to said turbine mast, said turbine comprising at least one turbine blade;
    moving said barge to an offshore installation site;
    removing said temporary support;
    inserting a ballast material into said conduit and said second internal volume through said opening, thereby causing said platform to rotate about said trunnion through said open passage into an upright position;
    closing said opening with a cover; and
    disengaging said trunnion from said rotational support.

2. The method of claim 1 further comprising:
    attaching at least one buoyancy tank to said platform.

3. The method of claim 1 wherein said disengaging comprises ballasting said barge to relieve stresses at an intersection between said trunnion and said rotational support.

4. The method of claim 1 further comprising:
    connecting one or more guide lines to said platform or said turbine mast; and
    securing said one or more guide lines to a sea floor with one or more anchors.

5. The method of claim 1 further comprising:
    connecting said turbine to an electrical facility with an electrical line.

6. An offshore wind turbine assembly comprising:
    an elongated platform comprising a buoyant column comprising a first internal volume, an opening, and a cover configured for closing said opening;
    a trunnion engaged with said platform and about which said platform is rotatable;
    an equalizer disposed at an end of said platform and aligned with a central longitudinal axis of said platform, said equalizer comprising a second internal volume;
    a conduit in fluid communication with said opening and said second internal volume;
    an elongated turbine mast depending from a second end of said platform; and
    a turbine mounted to said turbine mast, said turbine comprising at least one turbine blade;
    wherein said opening is configured to receive a ballast material;
    wherein said conduit is configured to channel at least some of said ballast material from said opening to said second internal volume; and
    wherein said first internal volume is configured to provide buoyancy.

7. The assembly of claim 6 further comprising at least one buoyancy tank attached to said platform.

8. The assembly of claim 6 wherein said equalizer is spherical.

9. The assembly of claim 6 wherein said platform is cylindrical.

10. The assembly of claim 9 wherein said conduit comprises a tube within said platform, wherein said first internal volume comprises an annular volume disposed about said tube, and wherein said platform, said tube, and said annular volume share a longitudinal axis.

11. The assembly of claim 6 wherein said first internal volume has a length less than that of said platform.

12. The assembly of claim 6 wherein said conduit comprises a plurality of tubes disposed within said platform.

13. The assembly of claim 6 wherein said platform and said turbine mast are connected by respective flanges bolted together.

14. An offshore wind turbine construction and installation apparatus comprising:
    a barge comprising an end, a rotational support, and an open passage extending from said end to a location proximate said rotational support;
    an elongated platform comprising a buoyant column comprising a first internal volume, an opening, and a cover configured for closing said opening;
    a trunnion engaged with said platform and about which said platform is rotatable, said trunnion being rotatably engaged with said rotational support;
    an equalizer depending from a first portion of said platform, said equalizer comprising a second internal volume;
    a temporary support on which said platform is configured to rest in a first position, said temporary support being removable to allow said platform to rotate through said open passage to an upright position;
    a conduit in fluid communication with said opening and said second internal volume;
    an elongated turbine mast depending from a second portion of said platform; and
    a turbine mounted to said turbine mast, said turbine comprising at least one turbine blade;
    wherein said opening is configured to receive a ballast material;
    wherein said conduit is configured to channel at least some of said ballast material from said opening to said second internal volume;
    wherein one or both of said second internal volume and said conduit are configured to receive a sufficient amount of said ballast material to cause said platform to rotate from said first position to said upright position when said temporary support is removed; and
    wherein said first internal volume is configured to provide a buoyant force that produces a restorative moment on said platform toward said upright position if said platform is perturbed from said upright position.

15. The apparatus of claim 14 wherein said equalizer is spherical.

16. The apparatus of claim 14 further comprising at least one buoyancy tank attached to said platform.

17. The apparatus of claim 14 wherein said platform is cylindrical, wherein said conduit comprises a tube within said platform, wherein said first internal volume comprises an annular volume disposed about said tube, and wherein said platform, said tube, and said annular volume share a longitudinal axis.

18. The apparatus of claim 14 wherein said platform and said equalizer are sized such that said equalizer is adapted to contact a sea floor beneath said barge when said platform is in said upright position and said trunnion is still engaged with said rotational support.

19. The apparatus of claim 14 wherein said platform and said equalizer are sized such that said equalizer does not contact a sea floor beneath said barge when said platform is in said upright position and said trunnion is still engaged with said rotational support.

20. The apparatus of claim 14 further comprising a pump mounted on said barge and a hose adapted to inject said ballast material from said pump into said opening.

* * * * *